(12) United States Patent
De Moura Partika

(10) Patent No.: US 10,507,793 B1
(45) Date of Patent: Dec. 17, 2019

(54) ALARM, SAFETY DEVICE AND DEVICE FOR EXPELLING ATTACKERS FOR MOTOR VEHICLES

(71) Applicant: Felipe Boris De Moura Partika, São Paulo (BR)

(72) Inventor: Felipe Boris De Moura Partika, São Paulo (BR)

( * ) Notice: Subject to any disclaimer, the term of this patent is extended or adjusted under 35 U.S.C. 154(b) by 0 days.

(21) Appl. No.: 16/104,290

(22) Filed: Aug. 17, 2018

(51) Int. Cl.
| | |
|---|---|
| *B60R 25/104* | (2013.01) |
| *G08B 13/196* | (2006.01) |
| *G08B 15/02* | (2006.01) |
| *B60Q 5/00* | (2006.01) |
| *B60Q 9/00* | (2006.01) |
| *B60R 25/102* | (2013.01) |
| *B60R 25/30* | (2013.01) |
| *B60R 25/31* | (2013.01) |
| *B60R 25/10* | (2013.01) |

(52) U.S. Cl.
CPC ............ *B60R 25/104* (2013.01); *B60Q 5/005* (2013.01); *B60Q 9/00* (2013.01); *B60R 25/102* (2013.01); *B60R 25/1004* (2013.01); *B60R 25/302* (2013.01); *B60R 25/305* (2013.01); *B60R 25/31* (2013.01); *G08B 13/19647* (2013.01); *G08B 15/02* (2013.01); *B60R 2025/1016* (2013.01)

(58) Field of Classification Search
CPC . B60R 25/104; B60R 25/1004; B60R 25/102; B60R 25/302; B60R 25/305; B60R 25/31; B60R 25/1016; B60Q 5/005; B60Q 9/00; G08B 13/19647; G08B 15/02
See application file for complete search history.

(56) References Cited

U.S. PATENT DOCUMENTS

| | | | | |
|---|---|---|---|---|
| 5,398,016 A | * | 3/1995 | Burayez | ................ B60R 25/104 116/214 |
| 5,424,712 A | * | 6/1995 | Rosenberger | ........... B60R 25/10 340/425.5 |

(Continued)

FOREIGN PATENT DOCUMENTS

| | | |
|---|---|---|
| BR | 97078492 | 1/2000 |
| BR | 00032468 | 6/2000 |

(Continued)

*Primary Examiner* — Munear T Akki
(74) *Attorney, Agent, or Firm* — Browdy and Neimark, PLLC

(57) ABSTRACT

An alarm, safety device and device for expelling attackers for vehicles, to protect the vehicle and its occupants when stopped, parked or moving, containing a sound alarm, a lighting alarm, a surveillance camera inside the vehicle for face recognition of a non-authorized driver, a remote system for sending information to the police authority, having a smoke release system, surveillance cameras and sensors installed within boxes at external locations of the vehicle. The surveillance cameras monitor the external activity of the vehicle, the images as received by the cameras being analyzed in real time by an internal processing center, provided with an artificial intelligence processor, processing those images by a public domain algorithm, trained for recognizing violence-related objects, wherein the images are processed and transformed into data matrices which are submitted to a neural open code network, for recognizing the presence of violence-related objects in the hands of a person in or near the vehicle.

17 Claims, 9 Drawing Sheets

(56) References Cited

U.S. PATENT DOCUMENTS

| | | | |
|---|---|---|---|
| 5,589,814 A * | 12/1996 | Smith, Jr. | ............... B60R 25/00 116/42 |
| 2014/0306799 A1 | 10/2014 | Ricci | |
| 2016/0318476 A1 * | 11/2016 | Cogill | .................... B60R 25/30 |
| 2017/0066406 A1 | 3/2017 | Ricci | |
| 2018/0272992 A1 * | 9/2018 | Gage | .................. G06K 9/00771 |

FOREIGN PATENT DOCUMENTS

| | | |
|---|---|---|
| BR | 08045682 | 7/2010 |
| BR | 102015025728 A2 | 3/2018 |
| MU | 76009467 | 7/1998 |
| MU | 78018366 | 5/2000 |
| MU | 81020325 | 5/2003 |
| MU | 82027676 | 6/2004 |
| MU | 82030782 | 8/2004 |
| MU | 89029283 | 8/2011 |
| MU | 91001986 | 5/2013 |

\* cited by examiner

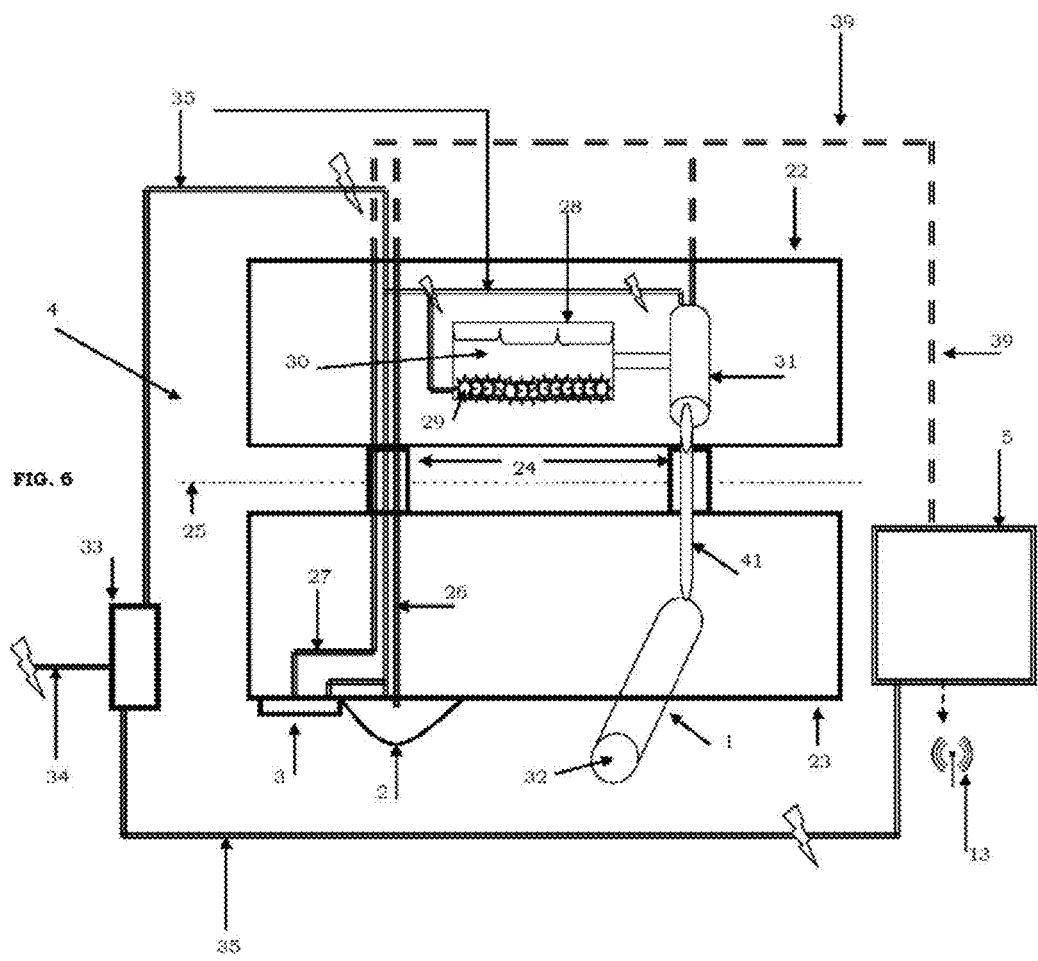

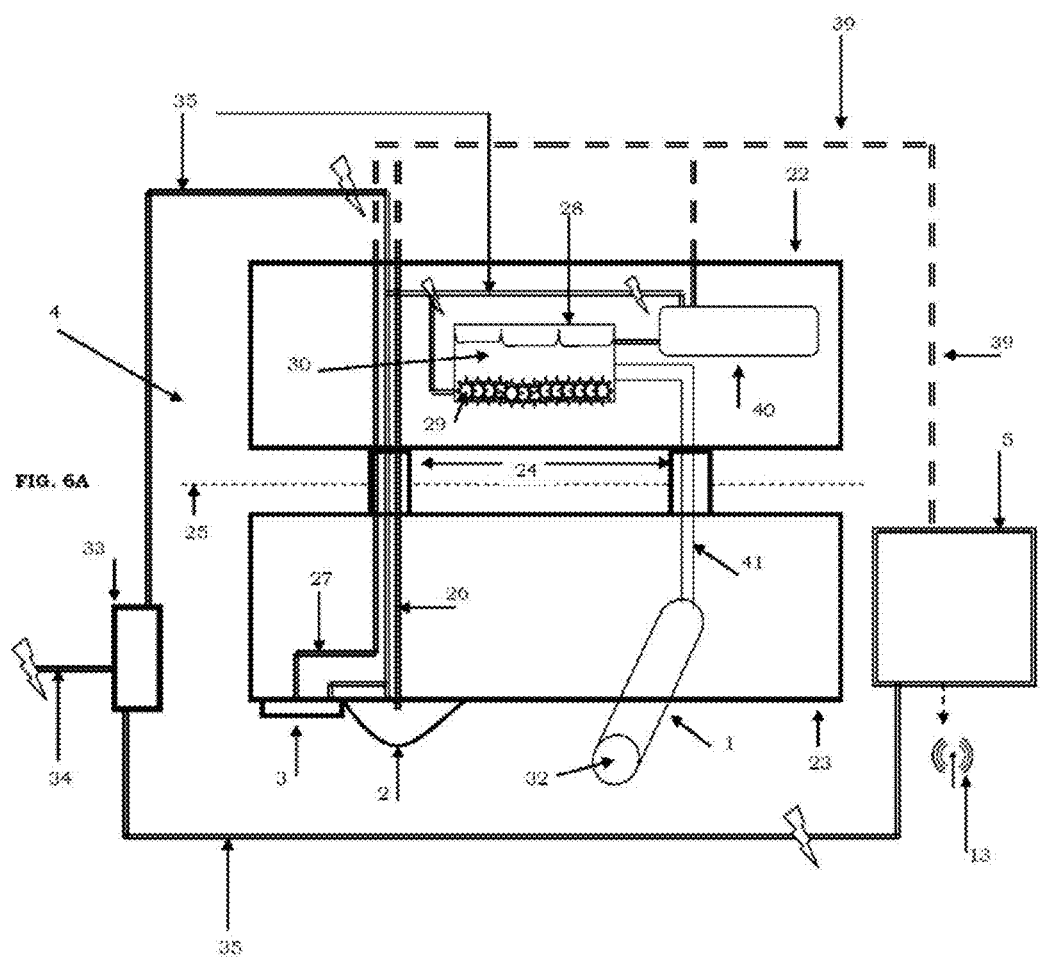

ALARM, SAFETY DEVICE AND DEVICE FOR EXPELLING ATTACKERS FOR MOTOR VEHICLES

FIELD OF THE INVENTION

The present invention refers to a system designed for the personal protection of motor vehicle users, upon an imminent occurrence (aggression, robbery, etc.), so to protect said users and chase away threatening individuals.

BACKGROUND OF THE INVENTION

Currently, safety is an extremely worrying factor for population, be it inside residences, while moving on the streets and especially when driving motor vehicles.

When driving motor vehicles on the streets, avenues, routes, etc. with high and/or jammed traffic, while stopping at traffic signs, etc., the user and passengers of said vehicle lack protection, thus becoming easy targets for attackers and thieves, sneaking and surprising the occupants of the motor vehicle, not allowing the adoption of any evasive action, since the traffic is jammed or intense.

It is common knowledge that, in risk situations as disclosed above, the driver of a motor vehicle should not react to avoid greater damage.

This situation occurs because the attacker/thief is fully reassured of his action, even knowing that the occupants of the vehicle will not react.

However, in case of a preventive action against the attacker/thief, so to advise the occupants of the vehicle of the danger and keep them safe, that reaction will cause said attacker/thief to withdraw from his intent, since the surprise factor is gone.

Hundreds of alarms and protection devices have already been created and installed in motor vehicles, all of them attempting to hamper the action of thieves and attackers.

All these alarms and devices work to avoid the vehicle to be powered on (cutting fuel, cutting ignition, etc.); to remove the vehicle; to avoid opening the vehicle; to issue a sound and light alarm at the time of breaking in; to remotely inform the owner of the vehicle or security center, for the vehicle owner or a security center to remotely lock the vehicle; to track the vehicle; in short, systems work to avoid vehicle removal or its location, but do not work to physically repel/chase away a thief, before he even starts the threatening action.

Furthermore, these alarms, with the exception of the locking function and ignition cut, only work with a parked vehicle.

To help to protect the user of a motor vehicle and protect said vehicle, the present application works to preview the action by the attacker/thief, by monitoring the environment outside the vehicle in real time, looking for violent behavior around the vehicle, being able to identify if the attacker/thief holds a fire gun and, in positive case, the system is turned on to repel the aggression, by beeping, releasing smoke, pepper spray and even an electric discharge against the attacker/thief, so to intimidate him and make him withdraw from the attack/robbery.

Furthermore, the system records the occurrences around the vehicle in video, sending them to a center, to another indicated person, a police authority, etc., so to guarantee the safety of the vehicle user and even enable to identify the attacker/thief.

The system also has a panic button inside the vehicle, in a place which cannot be identified from outside said vehicle, and said panic button may be pressed to activate the alert mode of the safety system.

Considering the system versatility, since its control is performed by one single intelligent center, sensors, cameras, repressive devices etc. may be installed in various simultaneous locations within the vehicle, so to keep protection and vigilance in a 360° angle.

Analysis of the State of the Art

There are hundreds of alarms and protection devices for motor vehicles in a wide range of forms, highlighting documents US 2014/0306799, dated Oct. 16, 2014, and US 2017/0066406, dated Sep. 19, 2016, referring to a personal detection system, but solely working to detect if someone near the vehicle is authorized, i. e. the user pre-register authorized persons to enter and use the vehicle into the detection system. If the system detects non-authorized persons entering the vehicle (after breaking in or robbery), a sound alarm will be activated, the vehicle will be locked, an alert will be sent to the police, etc.

The Brazilian document BR 1020150257287 refers to a remote monitoring and alarm system, with possible vehicle locking, alarm and control by mobile phone.

The Brazilian document MU 76009467 refers to an alarm system having electrodes installed within the vehicle at strategic points of the panel, emitting electrical charge to the thief.

The Brazilian document MU 78018366 refers to an alarm system with a tracking system.

The Brazilian document MU 81020325 refers to an alarm system which, when the vehicle is broken in, an alarm is sent to the owner by means of a phone call.

The Brazilian document MU 82027676 refers to an alarm system by retreating, only protecting the vehicle when parked, wherein the user of the vehicle, when departing to more than 10 meters away from the vehicle, activates the alarm and automatically locks the vehicle.

The Brazilian document MU 82030782 refers to an alarm system remotely advising the vehicle owner, by means of a phone message, in case of breaking in, violation and/or collision, including with a sound alarm.

The Brazilian document MU 89029283 refers to an alarm simulator system.

The Brazilian document MU 91001986 refers to an alarm system allowing to lock the vehicle, lock the doors, and close the windows.

The Brazilian document PI 00032468 refers to an alarm system advising the owner by means of a LED signal.

The Brazilian document PI 08045682 refers to an alarm system signaling a non-authorized invasion into the vehicle.

The Brazilian document PI 97078492 refers to a blocking alarm system and sound alarm; besides numerous other systems, all of them intended to block the vehicle and beep after the break-in or invasion.

All these sound systems are already known and intended to attempt to protect the vehicle when parked, not alerting the user of the vehicle on the approach of the danger or violent behavior.

OBJECTS AND ADVANTAGES OF THE INVENTION

Therefore, aiming to provide a new alarm system and safety device, so to protect motor vehicle users from strikes by attackers and/or thieves, while the vehicle is on traffic, stopped in a traffic jam or at a traffic light, the applicant has developed the present alarm system and safety device for expelling an attacker, to repel an aggressive attack or thief attack and keep the motor vehicle user safe.

While driving a motor vehicle on public roads, especially when stopping at a traffic jam, under heavy traffic or at traffic lights, users are subject to a surprise strike by an attacker and/or thief, holding a fire gun.

The applicant's alarm system, by means of cameras located around the motor vehicle, covering the whole perimeter of said motor vehicle, monitors vehicle surroundings and checks the sneaky approach of an individual.

The present alarm system has an artificial intelligence center, analyzing in real time the images provided by the cameras installed around the motor vehicle, so to detect violent behavior, since said artificial intelligence center processes images, recognizes the presence of violence-related objects, including fire guns, on the hands of the attacker/thief.

Said processing center, by using artificial intelligence, also analyzes information broadcast by sensors installed around the motor vehicle to detect violent behavior, such as sudden vibrations.

Images and information received by cameras and sensors, besides being analyzed by the processing center with artificial intelligence in real time, are also stored on the memory of the alarm system and remotely sent to an external computer, where they are processed by another artificial intelligence center to enhance the ability to recognize violent behavior, meaning that the alarm system daily learns and improves, upon receiving new images and situations.

After processing by the external computer, improvements are remotely sent to the alarm systems installed on motor vehicles, permanently updating and improving the system.

Said artificial intelligence center works with an algorithm in public domain, and the present system uses deep learning with an open code convolution neural network, such as: TENSORFLOW (Google Inc.), OPENN (Artelnics), CNTK (Microsoft), THEANO (Theano Inc.), etc.; trained for recognizing violence-related objects, such as: guns, handguns, knives and other melee weapons. The images are processed by the open source library OpenCV, where they are transformed into data matrices called Tensors, said data matrices being submitted to a neural open code network to recognize object indicating violence.

Upon recognizing violent behavior near the motor vehicle, the alarm system starts protection mode, activating defenses of the motor vehicle, duly installed around its perimeter and issuing a sound and light alarm through vehicle lights.

If the possibility of violence persists, i. e. the attacker/thief has not been repelled by the sound signal and/or alarming lights and walks towards the vehicle doors, the system releases smoke or another element to expel the attacker/thief, thus repelling the aggression.

The protection mode of the alarm system may also be manually activated by the motor vehicle user, by means of a panic button, installed within said motor vehicle at a hidden location, to avoid its identification from outside the motor vehicle. When the panic button is pressed, the system enters protection mode and its features are the same as disclosed by the automatic protection mode activation.

Besides the attack repelling function, the alarm system, when entering protection mode, enables the storage of images from cameras and sensors on the internal memory of the system, allowing their remote delivery to a police authority, jointly with the vehicle location, or to the place which may be pre-established by the motor vehicle user.

The smoke release system consists of a resistor heating a fluid contained within a container installed outside the vehicle at strategic locations, wherein said liquid, when heated by the resistor, evaporates, becoming smoke which is pumped to outside the container towards the attacker/thief by an electric pump or by a compressed gas system.

Refilling the liquid constituting the smoke release system is an easy operation, just requiring the container to be taken off, filled in and put again in place. The substitution of the compressed gas refill is also an easy operation, just requiring to open the box, taking out the compressed gas tube and substituting it with a new refill.

Besides the smoke release system, in countries where the use of pepper spray is allowed, the system may include, instead of the smoke release system, a pepper spray which is added to repel an attacker/thief, when the alarm enters safety mode. Similarly, refilling the pepper spray is an easy operation, just requiring its cartridge or container to be substituted after use.

The alarm system is fed by a rechargeable self-autonomous battery, which is connected to the battery of the motor vehicle, for full recharge.

The alarm system center is housed in a shielded case, inside the motor vehicle, where the artificial intelligence processor, memories, communications and further electric/electronic constituents are located.

It is possible to install any number of expelling devices outside the vehicle, and all existing devices may be synchronized, for their simultaneous activation.

The device installed on the windscreen is constituted by two cameras, one of which is faced outside the vehicle to monitor external violent behavior and another camera is turned to inside the motor vehicle, so to proceed with the face identification of the driver and send the images to the police authority or wherever the user may desire, including with the publication of the location information at a Blockchain network (an encrypted open code data network), for statistics, insurance, etc.

Images from cameras and sensors are processed and classified by the internal artificial intelligence center and may trigger protection mode, according to the seriousness of the situation and proximity levels.

DESCRIPTION OF DRAWINGS

To complement the present description so to obtain better understanding of the features of the alarm system and according to one of its preferential practical embodiments, the description is followed by the attached set of figures, in which the following was represented as examples but in a non-limitative way:

FIG. 6 shows the internal constituents of the alarm and safety devices;

FIG. 6A shows internal constituents of the alarm and safety devices;

DETAILED DESCRIPTION OF THE INVENTION

Figure 1:
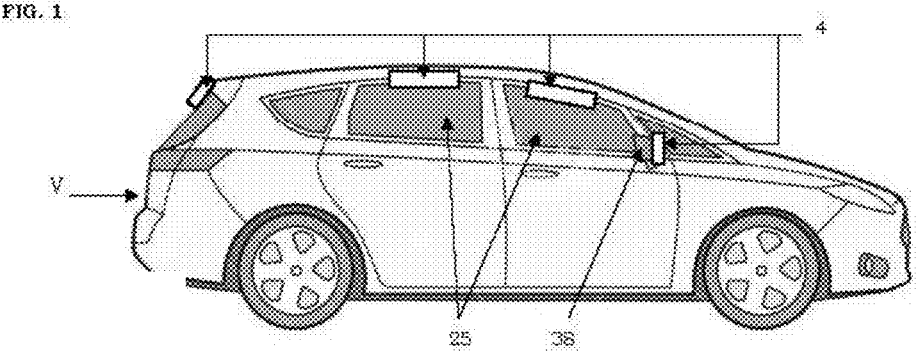
FIG. 1 is a side view of the motor vehicle, with alarm and safety devices installed on side doors.
Figure 2:
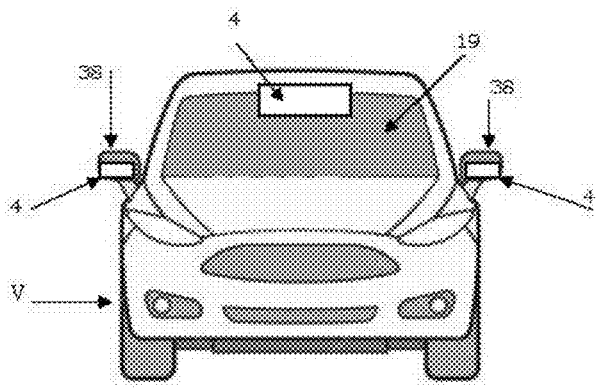
FIG. 2 is a front view of the motor vehicle, with the alarm and safety device installed on the windscreen.
Figure 3:
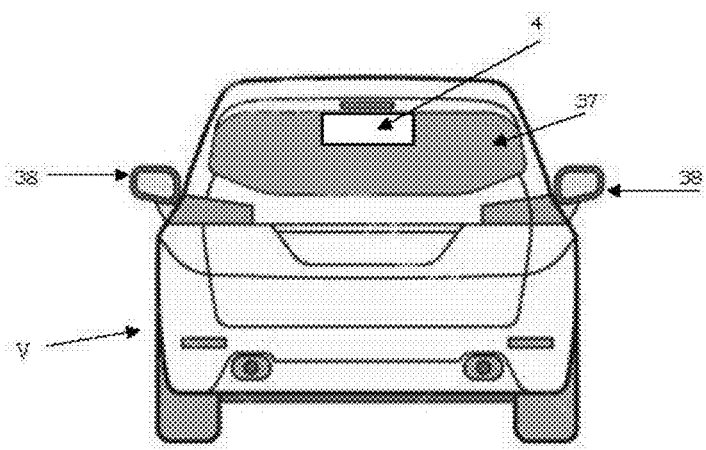
FIG. 3 is a rear view of the motor vehicle, with the alarm and safety device installed on the rear window.
Figure 4:
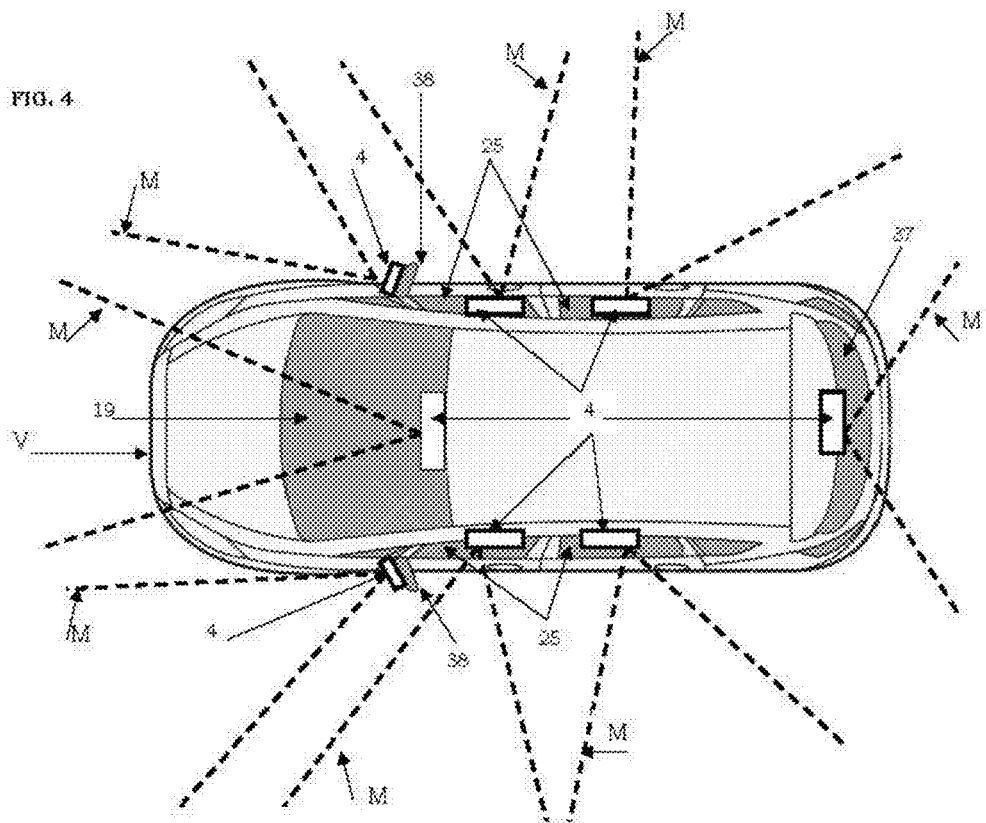
FIG. 4 is an aerial view of the vehicle, with the installed alarm and safety devices and the form of operation of sensors.
Figure 5:
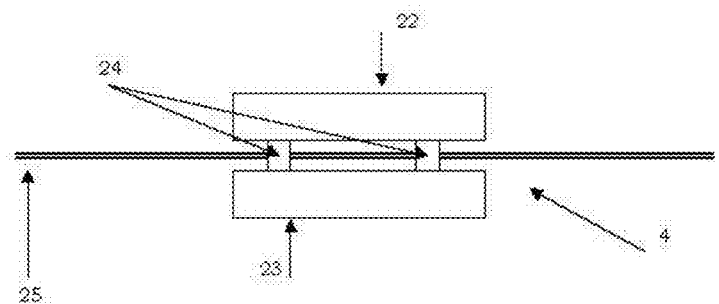
FIG. 5 is an aerial view of the alarm and safety device, already installed on the window of the motor vehicle.
Figure 7:
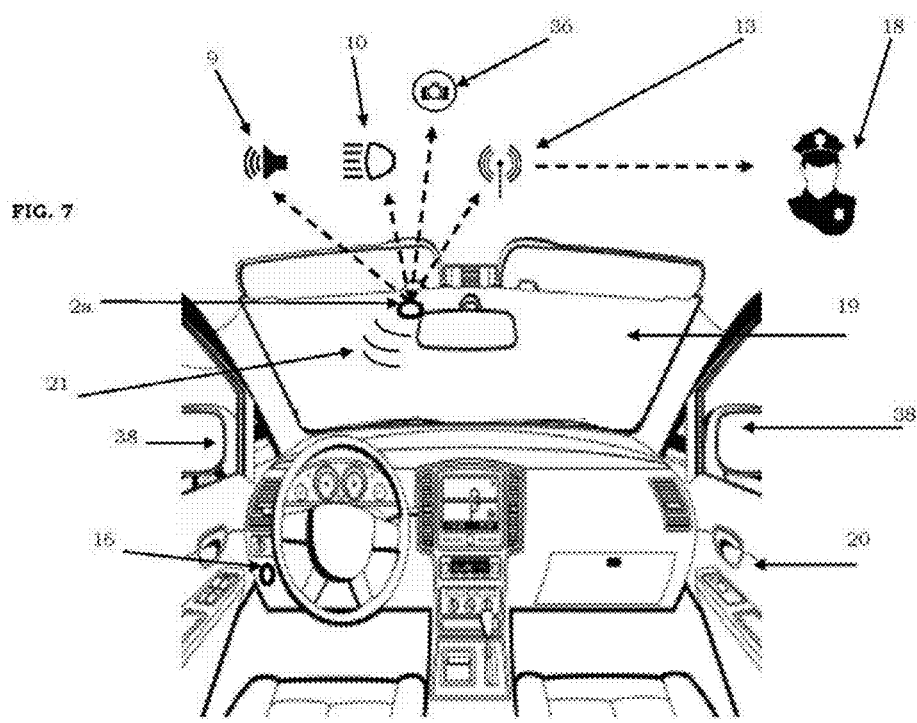
FIG. 7 shows the camera, internally installed on the front windscreen, to record images of the driver and the panic button.
Figure 8:
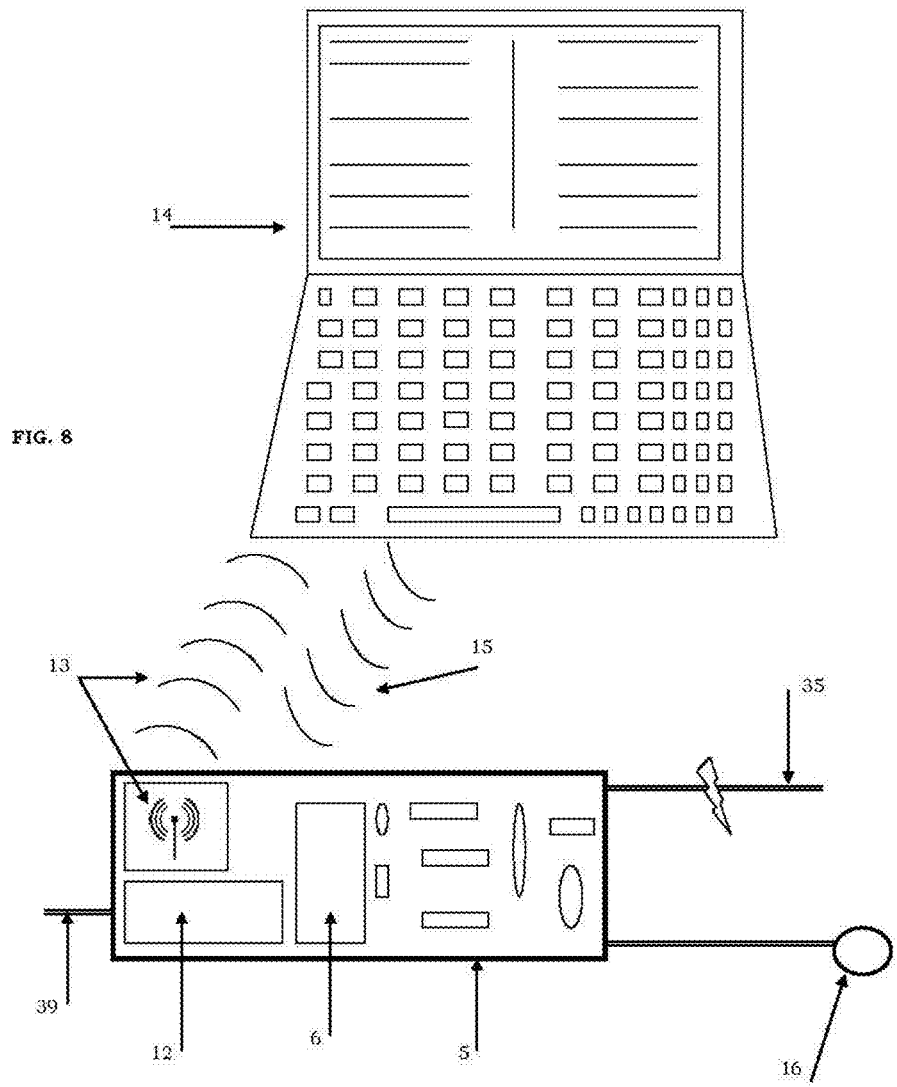
FIG. 8 shows the internal center for the alarm and safety device and the panic button.
Figure 9:
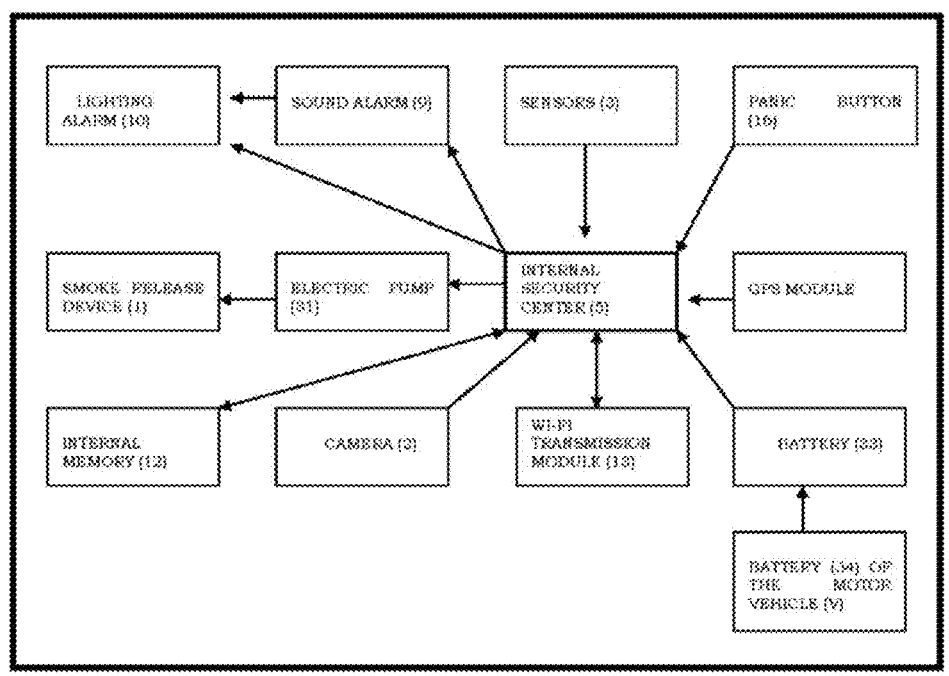
FIG. 9 shows the flowchart of operation of the alarm and safety device.
Figure 10:
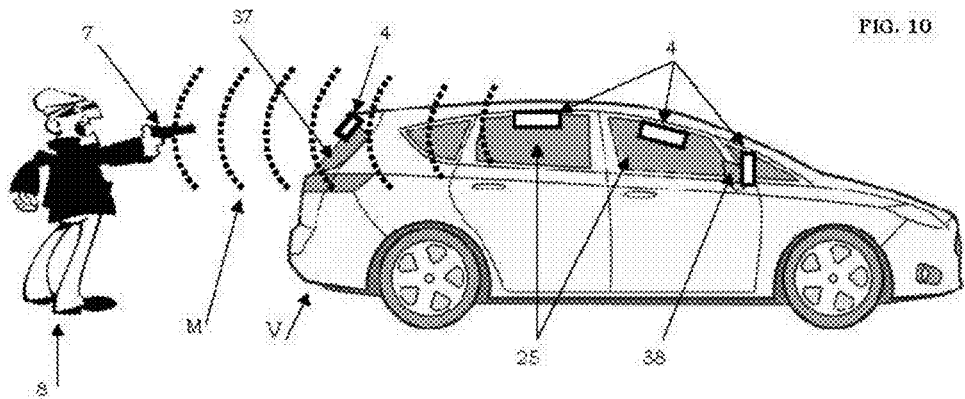
FIG. 10 shows violent behavior detection by the alarm and safety device.
Figure 11:
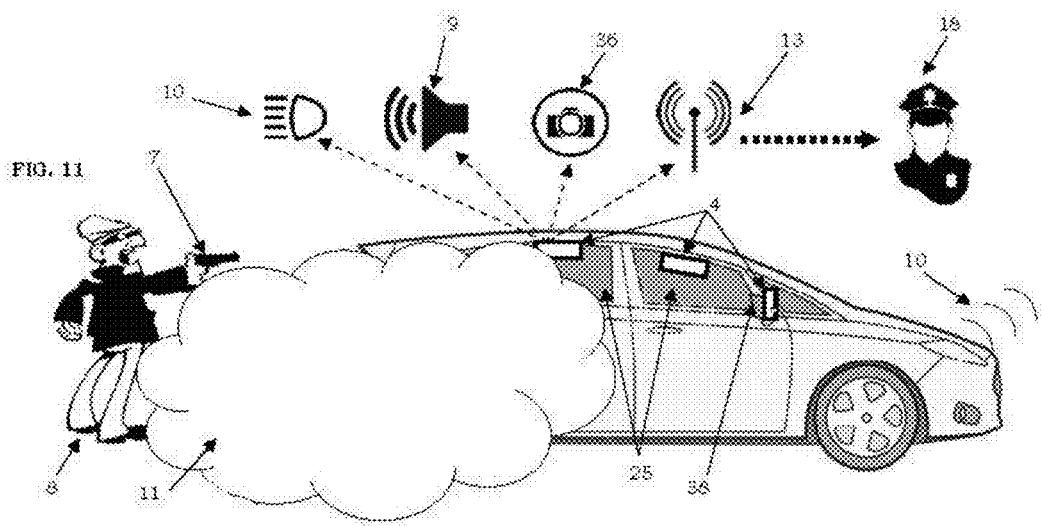
FIG. 11 shows the activation of the alarm and safety device, with the smoke release system and the other safety devices also in operation.
Figure 12:
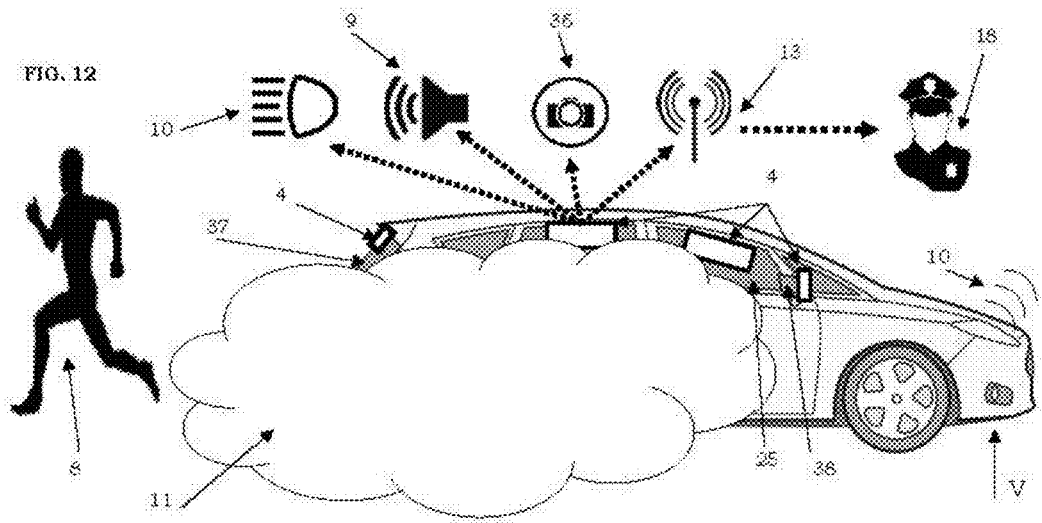
FIG. 12 shows the attacker/thief escaping from the location after the smoke release device is activated.
Figure 13:
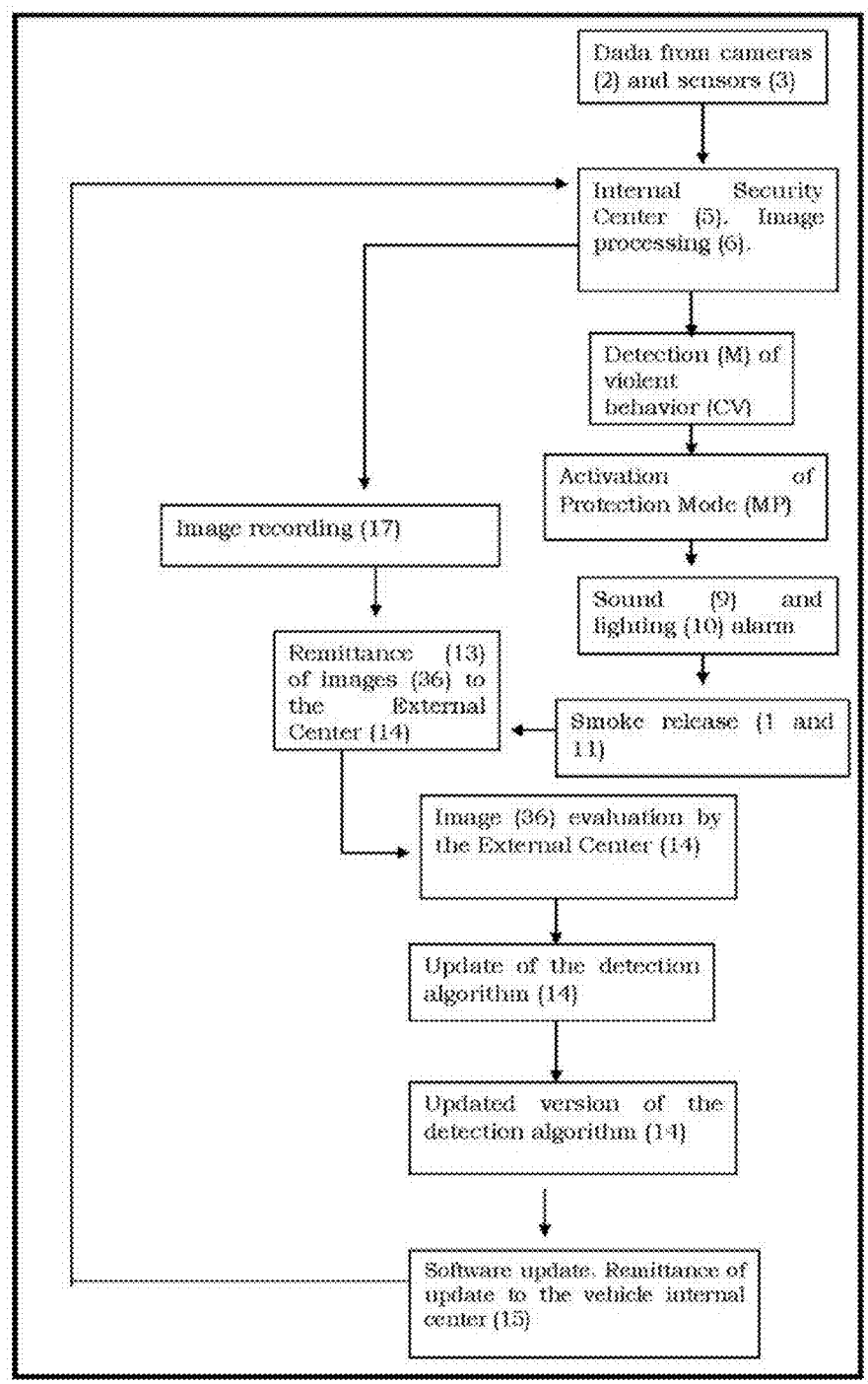
FIG. 13 shows the operation flowchart of the alarm and safety device, with the internal operation and connection to the external center.

Concerning the figures as shown, the present application refers to an "ALARM, SAFETY DEVICE AND DEVICE FOR EXPELLING ATTACKERS FOR MOTOR VEHICLES", and refers, more precisely to an alarm system, safety device and device for expelling an attacker/thief, having a smoke release system (1), surveillance cameras (2) and sensors (2) installed in boxes (4) at outside locations of the motor vehicle (V), wherein the surveillance cameras (2) are intended to monitor (M) the external activity of said motor vehicle (V), the images (36) captured by said surveillance cameras (2) being analyzed in real time by an internal processing center (5), provided with an artificial intelligence processor (6), processing said images (36) by means of a public domain algorithm, which system uses deep learning with an open code convolution neural network, such as: TENSORFLOW (Google Inc.), OPENN (Artelnics), CNTK (Microsoft), THEANO (Theano Inc.), etc.; trained for recognizing violence-related objects, such as: guns, pistols, knives and other melee weapons, wherein images are processed by the open source library OpenCV, where they are transformed into data matrices called Tensors, wherein said data matrices are submitted to a neural open source network, for recognizing objects indicating violence, recognizing the presence of violence-related objects, including fire guns (7), on the hands of the attacker/thief (8), who is near said motor vehicle (V), and, when detecting said violent behavior (CV), it enters protection mode (MP) and starts steps to protect the occupants of the motor vehicle (V), by issuing a sound alarm (9), a lighting alarm (10), by using the lights of the motor vehicle (V) itself and activating smoke release devices (1), jointly installed with surveillance cameras (2) and sensors (3) in boxes (4) on external locations of the motor vehicle (V), wherein a smoke curtain (11) is released by the tube (32) towards the attacker/thief (8), thus repelling the attack/robbery and causing said attacker/thief (8) to evade.

The public domain algorithm with artificial intelligence and deep learning from the processing center with artificial intelligence (5), which is installed on the processor (6) of the internal security center (5), is also able to analyze, from the images (35) received from the surveillance cameras (2), information transmitted (27) by sensors (3) installed within the boxes (4) around the motor vehicle (V), so to detect violent behavior (CV), such as sudden vibration.

The images (35) received from the surveillance cameras (2) and information received by the sensors (3), besides being analyzed by the artificial intelligence center (6) in real time, are also stored in the memory (12) of the internal security center (5) and remotely sent (13) to an external computer (14), where this data is processed by that external computer (14), also provided with the same artificial intelligence algorithm in public domain with deep learning, to enhance the ability of recognition of violent behavior (CV), i. e. by using the system and the permanent remittance (13) of data from all users of the alarm system to the computer (14) of the external security center, the alarm system automatically "learns", improves and updates itself, so to detect new ways and methods of violent behavior (CV), wherein the external computer (14) automatically sends (15) such updates back to the users with an internal processing center (6) installed at the internal security center (5) in the motor vehicle (V), being automatically updated (15), wherein said process is continuous.

After such processing by the computer (14) of the external security center, improvements in the algorithm to recognize violent behavior (CV) are remotely forwarded (15) to the internal processing center (6) of the alarm system as installed at the internal security center (5) of motor vehicles (V), permanently updating and improving the system.

The alarm system, by means of its internal processing center (5), by analyzing images (36) and information sent by cameras (2) and/or sensors (3) installed within the boxes (4) around motor vehicles (V), when recognizing violent behavior (CV) near the motor vehicle (V), enters protection mode (MP) by activating defenses in the motor vehicle (V), duly installed within the boxes (4), installed at external locations of said motor vehicle (V), by issuing a sound alarm (9) and a lighting alarm (10), and both the sound alarm (9) and the lighting alarm (10).

When the possibility of violent behavior (CV) persists, i. e. the attacker/thief (8) has not been repelled by the warning sound alarm (9) and/or by the lighting alarm (10), the internal security center (5) activates, with no interference from the user of the motor vehicle (V), the smoke release device (1) or another element for expelling the attacker/thief (8), throwing a smoke curtain (11) by means of the tube (32), towards the attacker/thief (8), so to repel the attack.

The protection mode (MP) for the alarm system may also be manually activated by the user of the motor vehicle (V) by means of a panic button (16) installed within said motor vehicle (V) at a hidden place, so to avoid its identification from outside the motor vehicle (V), wherein the user of the motor vehicle (V), when activating the panic button (16), activates the protection mode (MP) of the alarm system and its functions are the same as disclosed upon the automatic activation of the protection mode (MP).

Besides repelling a possible attack, the present alarm system, upon entering protection mode (MP), enables recording (17) of the images (36) from surveillance cameras (2) and sensors (3) on the memory (12) of the internal security center (5), wherein said internal security center (5) sends these images (36) remotely (13) to the police authority (18), jointly with the vehicle location, obtained by the GPS module, or to where the user of the motor vehicle (V) previously decides, even publishing location information at a Blockchain network (an encrypted open code data network), for statistics, insurance, etc.

The box (4) installed on the windscreen (19) of the motor vehicle (V) is constituted by two surveillance cameras (2), being one surveillance camera (2) turned to the outside of the motor vehicle (V), to monitor external violent behavior (CV), and another surveillance camera (2a) turned to the inside (20) of the motor vehicle (V), so to allow face identification (21) of the driver, wherein, in case of non-recognition of authorized users, the system enters protection mode (MP), by activating a sound alarm (9) and a lighting alarm (10) of the motor vehicle (V), causing the motor vehicle (V) to be turned off, the ignition to be interrupted, the electric system to be turned off, etc., besides remotely transmitting (13) an alert and images (36) to the police authority (18) or to where the user previously decides.

The box (4) wherein surveillance cameras (2), sensors (3) and smoke release systems (1) are housed consists of two interconnected (24) cases (22 and 23), which are installed on the windows (25), windscreens (19) and back window (37) of the motor vehicles (V), wherein one case is located inside (22) the motor vehicle (V) and the other case is located outside (23) the motor vehicle (V), being these two cases (22 and 23) interconnected (24) by connectors, so to attach them to the window (25) of the motor vehicle (V) and allow the passage of the transmission wire (26) from the surveillance camera (2), the data transmission wire (27) from the sensors (3) and the outlet tube (41) for the smoke (11) produced by the smoke release device (1).

In case of installation of the box (4) on the rearview mirrors (38) of the motor vehicles (V), the cases (22 and 23) are installed by embedding the case (22) within external rearview mirrors (38) and fixing the external case (23) on the outside of the external rearview mirror (38), turned to the front of the motor vehicle (V).

The smoke release device (1), installed within the internal (22) and external (23) cases of the box (4), consists of a container (28) installed in the internal case (22), containing an electric resistor (29) and a fluid (30), wherein the electric resistor (29), upon receipt of the instruction (39) from the internal processing center (5), heats the fluid (30) which, upon being heated by the electric resistor (29), evaporates becoming smoke (11), which is pumped by an electric pump (31) or expelled by injection of compressed gas (40), through the connection tube (41) existing between the internal case (22) and the external case (23) of said box (4), to the outlet (32) existing on the external case (23) of the box (4), being expelled (11) by the outlet tube (32) towards the attacker/thief (8).

Refilling the fluid (30) from the electric resistor (29) or the compressed gas tube (40) constituting the smoke release device (1) is an easy operation, just requiring, to refill the fluid (30), to take the container (28) out from the case (23), fill it with new fluid (30) and return the container (28) inside the internal case (22); to substitute the electric resistor (29), just take the container (28) out from the case (23), substitute the damaged electric resistor (29) with a new electric resistor (29) and return the container (28) inside the internal case (22); and, to substitute the compressed gas tube (40), one just needs to open the internal case (22), take said compressed gas tube (40) out, substitute it with a new full compressed gas tube (40) and close the internal case (22).

Besides the smoke release device (1), in countries allowing the use of pepper spray, tear gas, paralyzing shots, glaring light, sound alarm, electric shock, etc., the system may hold such artifacts, which are activated by the internal security center (5), so to repel an attacker/thief (8), when the alarm enters protection mode (MP).

The alarm system, constituted by the internal security center (5), surveillance cameras (2), sensors (3), smoke release device (1) and electric pump (31), is supplied (35) by a self-autonomous rechargeable battery (33), which is connected (34) to the battery of the motor vehicle (V) for full recharge.

The internal security center (5) of the alarm system is housed inside the motor vehicle (V) in a protected and shielded place, where the artificial intelligence processor (6), memories (12), remote communication systems (13) and further electric/electronic constituents are housed.

Boxes (4) with safety devices may be installed inside any quantity on the windows (25), windscreens (19), rear window (37) and/or external rearview mirrors (38) of the motor vehicles (V), wherein the internal processing center (5) performs synchronization of all existing devices, so to activate them simultaneously.

The alarm system at issue allows for remote connection (13) to the police department; to private intranet networks; public internet; integration with mobile phone applications, or who the user determines; allowing for data exchange, image exchange, location of the motor vehicle (V); mapping locations of risk, etc.

The preferred embodiment of the present alarm system has been disclosed, wherein any modifications, adaptations and/or changes should be understood as being within the scope of privilege of the present invention.

The invention claimed is:

1. An alarm, safety device and device for expelling attackers for motor vehicles, used to protect a stopped, parked, or moving motor vehicle and its occupants being in the stopped, parked or moving motor vehicle comprising: a sound alarm, a lighting alarm, a surveillance camera inside the motor vehicle, for face recognition of a non-authorized driver, a remote system for sending information to a police authority, a smoke release system, surveillance cameras and sensors installed within boxes at external locations of the motor vehicle, wherein the surveillance cameras are intended to monitor the external activity of said motor vehicle, the images as received by said surveillance cameras are analyzed in real time by an internal processing center, provided with an artificial intelligence processor, processing images by a public domain algorithm, using deep learning with an open source neural network, trained for recognizing weapons, wherein images are processed by an open source library, where they are transformed into data matrices which are submitted to the open source neural network that recognizes the weapons, wherein when the artificial intelligence processor recognizes the presence of a weapon in the hands of a person who is near said motor vehicle, and, when detecting violent behavior, the alarm safety device enters a protection mode and starts steps to protect the occupants of the motor vehicle, by issuing a sound alarm, a lighting alarm, by using a horn and lights of the motor vehicle, and activating smoke release devices, jointly installed with the surveillance cameras and the sensors, wherein a smoke curtain is released by a tube towards said person, repelling an attack/robbery and causing said person to evade, simultaneously with the recording of images received by the surveillance cameras and remote remittance of said images and a location of the motor vehicle using a global positioning system (GPS) to the police authority, informing occurrence and publishing location information on an encrypted open code data network.

2. The alarm, safety device and device for expelling attackers for motor vehicles of claim 1, wherein the public domain algorithm with artificial intelligence and deep learning from an artificial intelligence center, which is installed on the processor of the internal security center, is also able to analyze, from images received from the surveillance cameras, information transmitted by the sensors to detect the violent behavior.

3. The alarm, safety device and device for expelling attackers for motor vehicles of claim 1, wherein the images received by the surveillance cameras and the information received by the sensors, are analyzed by an artificial intelligence center in real time, and stored on a memory of the internal security center and remotely sent to an external computer in the security center, wherein said data is processed by said external computer, using the public domain algorithm with artificial intelligence and deep learning, to improve and enhance the recognition of violent behavior, with system updating, wherein the external computer, after the system is updated, remotely sends that update back to users, for automatic and non-stop update of the internal processing center, installed at the internal security center in the motor vehicles.

4. The alarm, safety device and device for expelling attackers for motor vehicles of claim 1, wherein improvements in the algorithm for recognizing violent behavior as performed by the external computer are remotely sent from said external computer to the internal processing center of the alarm system as installed on the internal security center of motor vehicles, permanently updating and improving the system.

5. The alarm, safety device and device for expelling attackers for motor vehicles of claim 1, further comprising an alarm system, comprising the internal processing center, which, by analyzing images and information sent by the cameras and/or sensors, recognizes violent behavior near the motor vehicle, and enters protection mode by activating defenses in the motor vehicle, duly installed within the boxes, installed at external locations of said motor vehicle, by issuing the sound alarm and the lighting alarm, wherein both the sound alarm and the lighting alarm use horns and lights, respectively, already installed in the motor vehicle.

6. The alarm, safety device and device for expelling attackers for motor vehicles of claim 1, wherein when a possibility of violent behavior persists, because the person has not been repelled by the sound alarm and/or the lighting alarm, the internal security center activates, with no interference from an occupant of the motor vehicle, the smoke release device or another element for expelling the person, throwing a smoke curtain using the tube, towards the person, so to repel the attack.

7. The alarm, safety device and device for expelling attackers for motor vehicles of claim 1, wherein the protection mode for the alarm system is configured to be manually activated by an occupant of the motor vehicle using a panic button installed within said motor vehicle at a hidden place, to avoid its identification from outside the motor vehicle, wherein the occupant of the motor vehicle, when activating the panic button, activates the protection mode of the alarm system and its functions are the same as disclosed upon an automatic activation of the protection mode.

8. The alarm, safety device and device for expelling attackers for motor vehicles of claim 5, the alarm system, upon entering protection mode, enables recording of the images of surveillance cameras and sensors on a memory of the internal security center, wherein said internal security center remotely sends such images to the police authority (18), jointly with the location of the vehicle, obtained by the GPS, or where an occupant of the motor vehicle previously decides.

9. The alarm, safety device and device for expelling attackers for motor vehicles of claim 1, wherein the boxes comprise two interconnected cases, which are installed on windows, windscreens and rear window of the motor vehicles, a first one of the cases located inside the motor vehicle and a second one of the cases located outside the motor vehicle, wherein the two cases are interconnected by connectors, so to fix them to the window, the windscreen or the rear window and allow passage of a transmission wire from the surveillance cameras, a data transmission wire from the sensors and an outlet tube for the smoke produced by the smoke release device.

10. The alarm, safety device and device for expelling attackers for motor vehicles of claim 1, at least one of the boxes is installed on outer rearview mirrors of the motor vehicle and comprises two interconnected cases, wherein the two interconnected cases are installed by embedding one of the cases into a first one of the outer rearview mirrors, and fixing another one of the cases to an external side of a second one of the rearview mirrors, with the surveillance camera, the sensors and the smoke release device turned to a front of the motor vehicle.

11. The alarm, safety device and device for expelling attackers for motor vehicles of claim 1, wherein the boxes comprise an internal case and an external case, and the smoke release device is installed within the internal and external cases, and comprises a container installed in the internal case, the container containing an electric resistor and a fluid, wherein the electric resistor, upon receipt of an instruction from the internal processing center, heats the fluid which, upon being heated by the electric resistor, evaporates thus becoming smoke, which is pumped by an electric pump or expelled by injection of compressed gas, through a compressed gas tube disposed between the internal case and the external case, to an outlet tube disposed on the external case, being expelled by the outlet tube towards the person.

12. The alarm, safety device and device for expelling attackers for motor vehicles of claim 11, wherein refilling the fluid of the electrical resistor and the connected tube, constituting the smoke release device, is accomplished by removing the container from the external case, filling the container with new fluid and returning the container into the internal case; and replacing the electrical resistor is accomplished by removing the container from the external case, replacing a damaged electrical resistor with a new electrical resistor and returning the container into the internal case; and replacing the compressed gas tube is accomplished by opening the internal case, removing said compressed gas tube, replacing the compressed gas tube with a new full compressed gas tube and closing the internal case.

13. The alarm, safety device and device for expelling attackers for motor vehicles of claim 1, wherein the system allows, besides the smoke release device, the use of pepper spray, tear gas, paralyzing shots, electric shock, glaring light, and/or another kind of gas, which are activated by the internal security center, so to repel the person, when the alarm enters protection mode.

14. The alarm, safety device and device for expelling attackers for motor vehicles of claim 11, wherein the internal security center, the surveillance cameras, the sensors, the smoke release device and the electric pump supplied by a rechargeable self-autonomous battery, which is connected to a battery of the motor vehicle, for a full recharge.

15. The alarm, safety device and device for expelling attackers for motor vehicles of claim 1, wherein the internal security center is housed inside the motor vehicle in a protected and shielded place, where the artificial intelligence processor, memories, the remote communication system and additional electric/electronic components are disposed.

16. The alarm, safety device and device for expelling attackers for motor vehicles of claim 1, wherein the boxes with safety devices are installed in any quantity on the windows, windscreens, rear window and/or external rear-view mirrors, wherein the internal processing center synchronizes all the boxes, so to activate them simultaneously and/or only by pre-determined events.

17. The alarm, safety device and device for expelling attackers for motor vehicles of claim 1, wherein the alarm system is configured to permit remote connection to the police department, to private intranet networks, public internet, integration with mobile phone applications, or where the user decides, allowing for data exchange, image exchange, location of the motor vehicle, mapping of locations of risk, software update for the device, publication of location information at the encrypted open code data network.

\* \* \* \* \*